(12) United States Patent
Wieczorek et al.

(10) Patent No.: US 11,642,932 B2
(45) Date of Patent: May 9, 2023

(54) BUSHING ASSEMBLY FOR A STABILIZER BAR OF A VEHICLE

(71) Applicant: GM Global Technology Operations LLC, Detroit, MI (US)

(72) Inventors: Matthew Gregory Wieczorek, Imlay City, MI (US); Joshua P. Dupuis, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/497,309

(22) Filed: Oct. 8, 2021

(65) Prior Publication Data

US 2023/0116582 A1    Apr. 13, 2023

(51) Int. Cl.
*B60G 21/055*    (2006.01)
*F16F 1/373*    (2006.01)

(52) U.S. Cl.
CPC ........ *B60G 21/0551* (2013.01); *F16F 1/3732* (2013.01); *B60G 2202/135* (2013.01); *B60G 2204/1222* (2013.01); *B60G 2204/41* (2013.01)

(58) Field of Classification Search
CPC ........ F16F 2230/04; F16F 1/38; F16F 1/3835; F16F 2224/025; F16F 1/376; F16F 1/3732; B60G 21/052; B60G 2202/14; B60G 2206/73; B60G 11/003; B60G 2204/41; B60G 2202/135

See application file for complete search history.

(56) References Cited

U.S. PATENT DOCUMENTS

| 2,720,374 | A * | 10/1955 | Hutton | F16F 1/3732 403/224 |
| 9,579,948 | B2 * | 2/2017 | Khanlarov | B60G 21/055 |
| 9,931,902 | B2 * | 4/2018 | Tsukamoto | B60G 21/0551 |
| 10,415,666 | B2 * | 9/2019 | Nishi | F16F 1/3863 |
| 10,449,823 | B2 * | 10/2019 | Saihara | B29C 66/71 |
| 10,759,250 | B2 * | 9/2020 | Umeno | B60G 21/055 |
| 10,946,708 | B2 * | 3/2021 | Cho | B60G 11/12 |
| 11,235,633 | B2 * | 2/2022 | Knetsch | B60G 15/04 |

(Continued)

FOREIGN PATENT DOCUMENTS

| CA | 2732392 A1 * | 8/2012 | B60G 21/0551 |
| DE | 102019113484 A1 * | 11/2020 | |

(Continued)

*Primary Examiner* — Paul N Dickson
*Assistant Examiner* — Maxwell L Meshaka
(74) *Attorney, Agent, or Firm* — Vivacqua Crane PLLC

(57) ABSTRACT

A bushing assembly for a stabilizer bar in a vehicle includes a split ring defining a passageway engaging with an outer surface of the stabilizer bar, an outer diameter surface, a first split ring end, a second split ring end, and at least one axial retention flange disposed at either the first split ring end or the second split ring end. The bushing assembly includes an elastomer bushing defining an inner diameter, an outer diameter, a first bushing end, a second bushing end, a first axial flange disposed at the first bushing end, and a second axial flange at the second bushing end. At least one of the first axial flange and the second axial flange abut against the at least one axial retention flange of the split ring to create a zero clearance condition. The bushing assembly also includes a strap clamp securing the bushing assembly to the vehicle.

17 Claims, 7 Drawing Sheets

(56) References Cited

U.S. PATENT DOCUMENTS

| | | | | |
|---|---|---|---|---|
| 11,440,371 B2* | 9/2022 | Baudelet | ............ | B60G 21/0551 |
| 2015/0377312 A1* | 12/2015 | Russell | ................ | F16F 1/3856 |
| | | | | 156/60 |
| 2016/0137018 A1* | 5/2016 | Khanlarov | ......... | B60G 21/0551 |
| | | | | 248/580 |
| 2016/0303939 A1* | 10/2016 | Tsukamoto | ........ | B60G 21/0551 |
| 2017/0166025 A1* | 6/2017 | Auten | .................... | B60G 11/12 |
| 2018/0134110 A1* | 5/2018 | Saihara | .............. | B29C 66/1142 |
| 2018/0172109 A1* | 6/2018 | Nishi | ...................... | F16F 1/387 |
| 2018/0272828 A1* | 9/2018 | Umeno | ............... | B60G 21/055 |
| 2019/0100066 A1* | 4/2019 | Knetsch | ................ | B60G 13/16 |
| 2019/0315177 A1* | 10/2019 | Cho | ...................... | B60G 11/113 |
| 2020/0047578 A1* | 2/2020 | Wieczorek | ........... | F16F 1/3835 |
| 2020/0238784 A1* | 7/2020 | Boudier | ............ | B60G 21/0551 |
| 2021/0102592 A1* | 4/2021 | Gehman | ................ | B60G 7/001 |
| 2021/0122207 A1* | 4/2021 | Baudelet | ............ | B60G 21/0551 |
| 2022/0042567 A1* | 2/2022 | Geisen | ...................... | F16F 1/38 |
| 2022/0111693 A1* | 4/2022 | Knetsch | ................ | B60G 13/16 |
| 2022/0194152 A1* | 6/2022 | Ito | ............................ | F16F 1/00 |

FOREIGN PATENT DOCUMENTS

| | | | | |
|---|---|---|---|---|
| FR | 3003508 A1 | * | 9/2014 | ........... B60G 21/052 |
| GB | 2466516 A | * | 6/2010 | ......... B60G 21/0551 |
| KR | 20120063966 A | * | 12/2010 | |
| KR | 20170044813 A | * | 4/2017 | |
| KR | 101846533 B1 | * | 4/2018 | |

* cited by examiner

BUSHING ASSEMBLY FOR A STABILIZER BAR OF A VEHICLE

INTRODUCTION

The present disclosure relates to a bushing assembly for a stabilizer bar of a vehicle, as well as a method of assembling the bushing assembly and the stabilizer bar to a frame of the vehicle.

A stabilizer bar connects the left and right suspension components together in a vehicle and reduces body roll as the vehicle turns. In one specific approach, the stabilizer bar is mounted to the vehicle's frame by slipper bushings. However, slipper bushings allow for both torsional and axial movement, and thereby result in the slipper bushings requiring large clearances. Accommodating the large clearances required by slipper bushings may be an issue in some vehicles that have limited packaging space.

In one approach to alleviate these issues and reduce the amount of clearance required by the slipper bushings, a collar may be attached to the stabilizer bar to limit movement. However, there is still a need for some clearance because of frame build variations. In another approach, a gripper or bonded stabilizer bar that includes a rubber component bonded to the stabilizer bar may be used to limit motion. However, this approach is effective when employing relatively smaller stabilizer bars. This is because larger stabilizer bars create motion that generates a force that is greater than a strain capacity of the rubber material located at a rubber-to-bar interface of the gripper or bonded stabilizer bar.

Thus, while current stabilizer bars achieve their intended purpose, there is a need in the art for an improved approach for mounting a stabilizer bar to a frame of a vehicle.

SUMMARY

According to several aspects, a bushing assembly for a stabilizer bar in a vehicle is disclosed. The bushing assembly includes a split ring defining a passageway that engages with an outer surface of the stabilizer bar, an outer diameter surface, a first split ring end, a second split ring end, and at least one axial retention flange disposed at either the first split ring end or the second split ring end. The bushing assembly also includes an elastomer bushing defining an inner diameter, an outer diameter, a first bushing end, a second bushing end, a first axial flange disposed at the first bushing end, and a second axial flange disposed at the second bushing end. The inner diameter of the elastomer bushing engages with the outer diameter surface of the split ring, and at least one of the first axial flange and the second axial flange abut against the at least one axial retention flange of the split ring to create a zero clearance condition. The bushing assembly also includes a strap clamp disposed over the outer diameter of the elastomer bushing, where the strap clamp secures the bushing assembly to the vehicle.

In another aspect, the inner diameter of the elastomer bushing has a reduced coefficient of friction when compared to an elastomeric material the elastomer bushing is constructed of.

In yet another aspect, the reduced coefficient of friction is created by either a polytetrafluoroethylene (PFTE) liner or lubricant pockets disposed around the inner diameter of the elastomer bushing.

In still another aspect, the split ring includes a second retention flange that is offset from the second split ring end.

In yet another aspect, the split ring includes a locking feature disposed at the second split ring end.

In another aspect, the bushing assembly includes a split clamp divided into two halves, wherein the split clamp is disposed over the locking feature located at the second split ring end of the split ring.

In still another aspect, the split clamp defines an inner passage having an inner surface shaped to surround and engage with the outer surface of the stabilizer bar.

In another aspect, a step is located within an inner passage of the split clamp is shaped to surround and engage with the locking feature located at the second split ring end.

In yet another aspect, the split ring is constructed of a material having a coefficient of friction less than about 0.35 and a flexural modulus of at least about 3.1 Gigapascals.

In still another aspect, the elastomer bushing is constructed of an elastomeric material having a durometer that ranges from about 50 A to about 90 A on the Shore A scale.

In yet another aspect, the split ring includes a second retention flange disposed at the second split ring end.

In another aspect, the bushing assembly includes a split clamp divided into two halves, where an end surface of the split ring abuts against an end surface of the split clamp.

In yet another aspect, the bushing assembly also includes an adhesive layer disposed along an inner diameter surface of the passageway of the split ring.

In another aspect, the adhesive layer includes an adhesive that either bonds or adheres to the outer surface of the stabilizer bar.

In another aspect, a method for assembling a stabilizer bar assembly including a bushing assembly to a vehicle frame is disclosed. The method includes positioning a split ring along an outer surface a stabilizer bar, wherein the split ring defines a passageway that engages with the outer surface of the stabilizer bar, an outer diameter surface, a first split ring end, a second split ring end, and at least one axial retention flange disposed at either the first split ring end or the second split ring end. The method also includes securing an elastomer bushing around the outer surface of the split ring by a strap clamp, wherein the elastomer bushing defines a first bushing end, a second bushing end, a first axial flange disposed at the first bushing end, and a second axial flange disposed at the second bushing end, where at least one of the first axial flange and the second axial flange abut against the at least one axial retention flange of the split ring to create a zero clearance condition.

In one aspect, the method further includes placing two halves of a split clamp over a locking feature located at the second split ring end of the split ring.

In another aspect, the method also includes loosely securing the two halves of the split clamp to one another by mechanical fasteners.

In yet another aspect, the method includes centering the stabilizer bar assembly axially, and securing the stabilizer bar assembly to the vehicle frame by the strap clamp.

In another aspect, the method includes tightening the mechanical fasteners to compress the two halves of the split clamp against one another.

In one aspect, a bushing assembly for a stabilizer bar in a vehicle is disclosed. The bushing assembly includes a split ring defining a passageway that engages with an outer surface of the stabilizer bar, an outer diameter surface, a first split ring end, a second split ring end, a locking feature disposed at the second split ring end, and at least one axial retention flange disposed at either the first split ring end or the second split ring end. The bushing assembly also includes an elastomer bushing defining an inner diameter, an outer diameter, a first bushing end, a second bushing end, a first axial flange disposed at the first bushing end, and a second axial flange disposed at the second bushing end, where the inner diameter of the elastomer bushing engages with the outer diameter surface of the split ring, and at least one of the first axial flange and the second axial flange abut against the at least one axial retention flange of the split ring to create a zero clearance condition. The bushing assembly also includes strap clamp disposed over the outer diameter of the elastomer bushing, where the strap clamp secures the bushing assembly to the vehicle. The bushing assembly also includes a split clamp divided into two halves, where the split clamp is disposed over the locking feature located at the second split ring end of the split ring.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
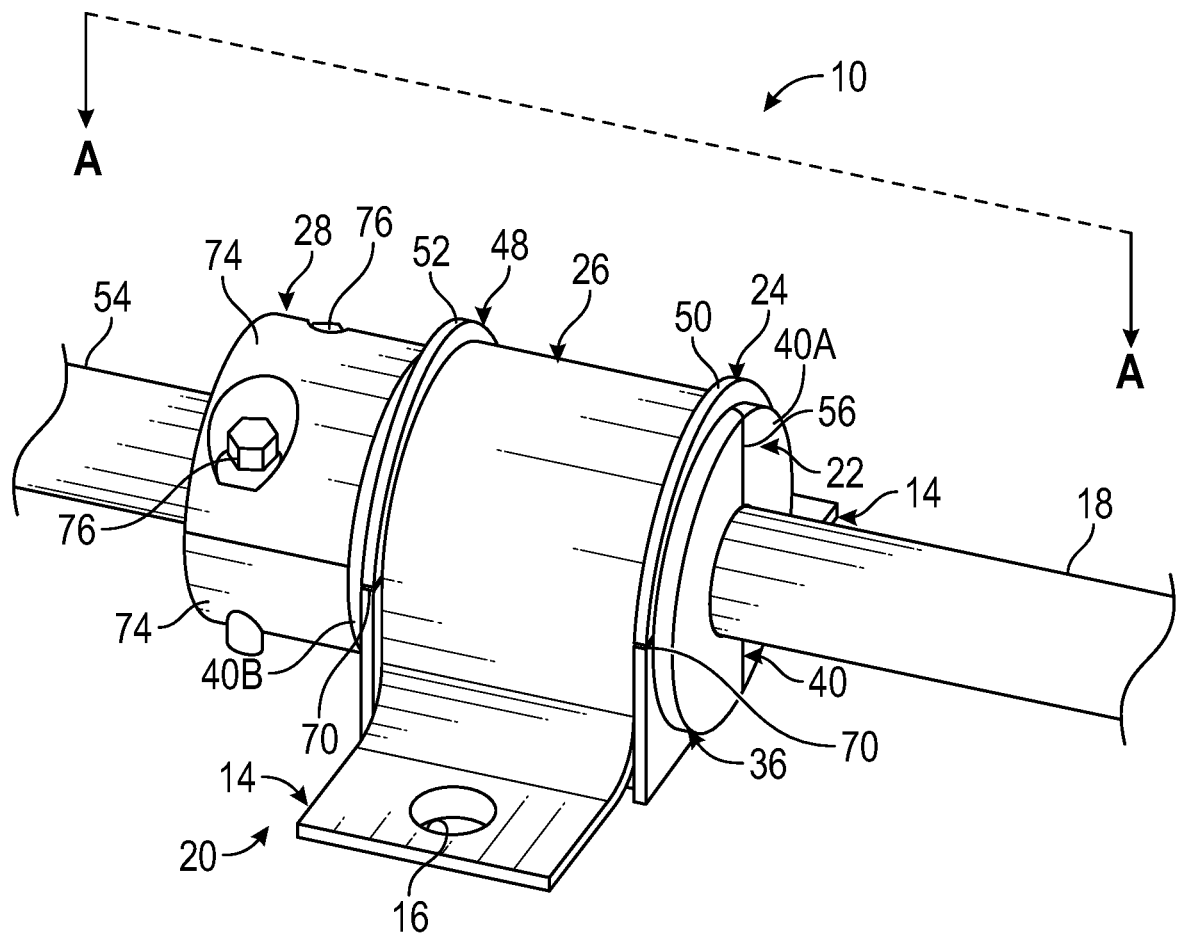
FIG. 1 is a perspective view of one embodiment of a stabilizer bar and a bushing assembly for a vehicle, according to an exemplary embodiment.
Figure 2A:
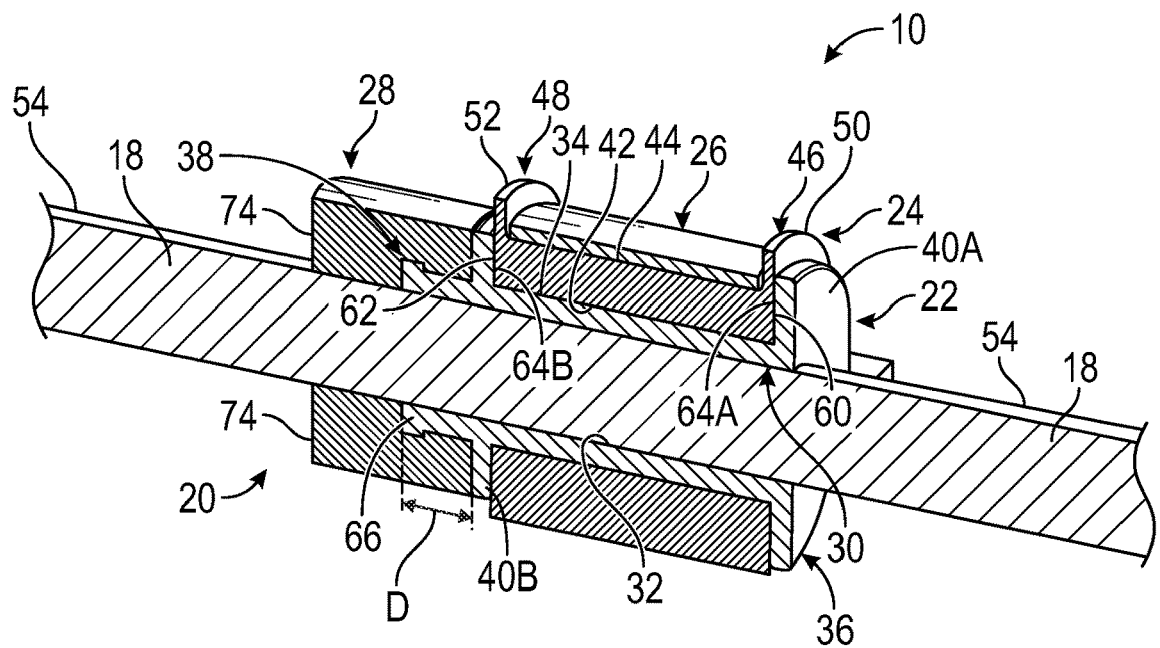
FIG. 2A is a cross-sectioned view of the stabilizer bar and the bushing assembly taken along section line A-A in FIG. 1, according to an exemplary embodiment.

Referring to FIG. 1, an exemplary stabilizer bar assembly 10 for a vehicle is illustrated. The stabilizer bar assembly 10 includes a stabilizer bar 18 and a bushing assembly 20 that mounts the stabilizer bar 18 a vehicle frame (not shown). Although a bushing assembly 20 is illustrated in FIG. 1, it is to be appreciated that the stabilizer bar 18 includes two bushing assemblies 20 corresponding to the left and right sides of the vehicle. FIG. 2A is a cross sectional view of the bushing assembly 20 shown in FIG. 1 taken along section line A-A. Referring to both FIGS. 1 and 2A, in one embodiment the bushing assembly 20 includes a split ring 22, an elastomer bushing 24, a strap clamp 26, and a split clamp 28. The strap clamp 26 includes opposing sides 14, where an aperture 16 is located on each of the opposing sides 14 of the strap clamp 26 (only one of the apertures 16 are visible in FIG. 1). The apertures 16 are shaped to receive a fastener (not shown). The fasteners received by the apertures 16 of the strap clamp 26 are also engaged with the vehicle frame to secure the stabilizer bar 18 to the vehicle frame.

Figure 5:
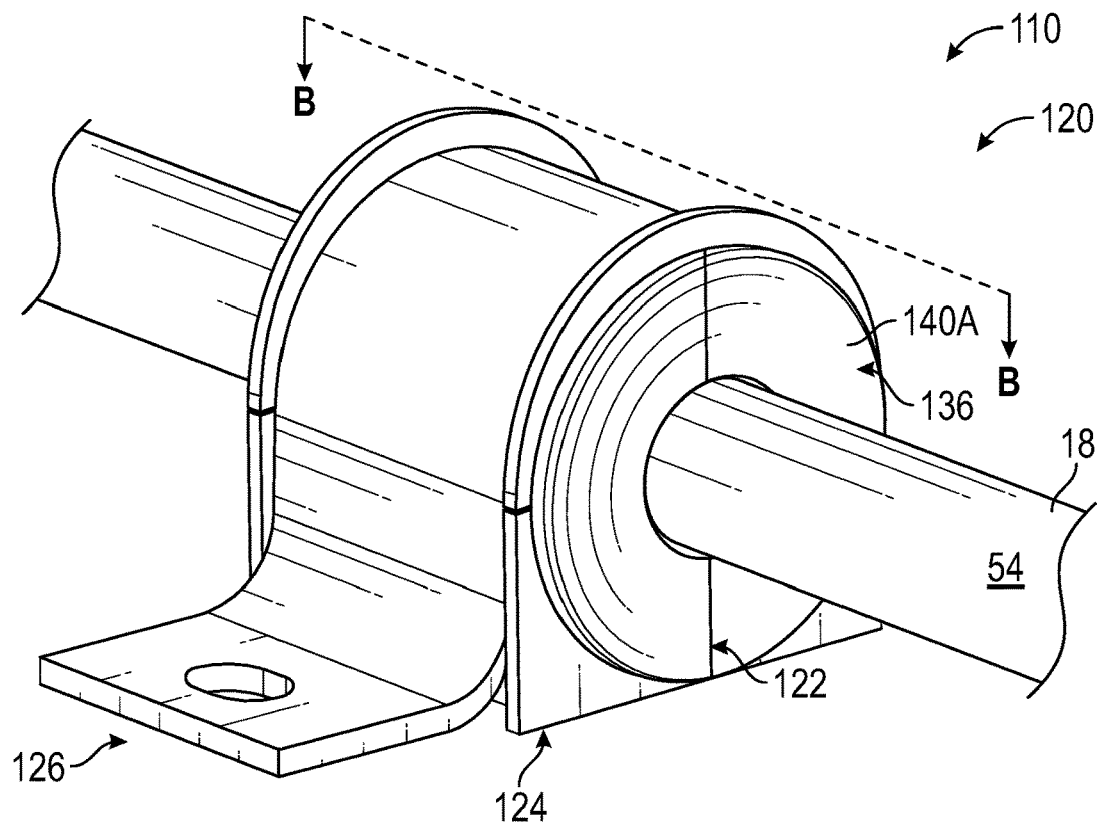
FIG. 5 is a perspective view of another embodiment of the bushing assembly, according to an exemplary embodiment.
Figure 6:
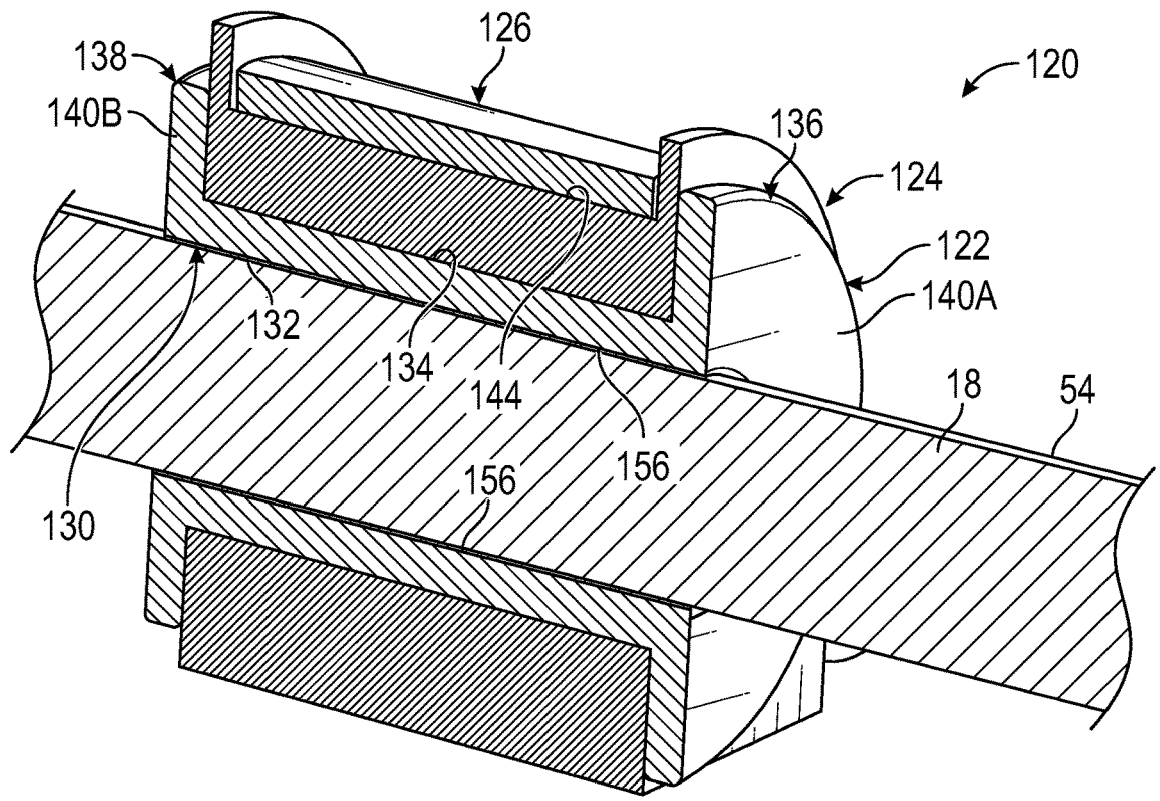
FIG. 6 is a cross-sectioned view of the stabilizer bar and the bushing assembly taken along section line B-B in FIG. 5, according to an exemplary embodiment.
Figure 8:
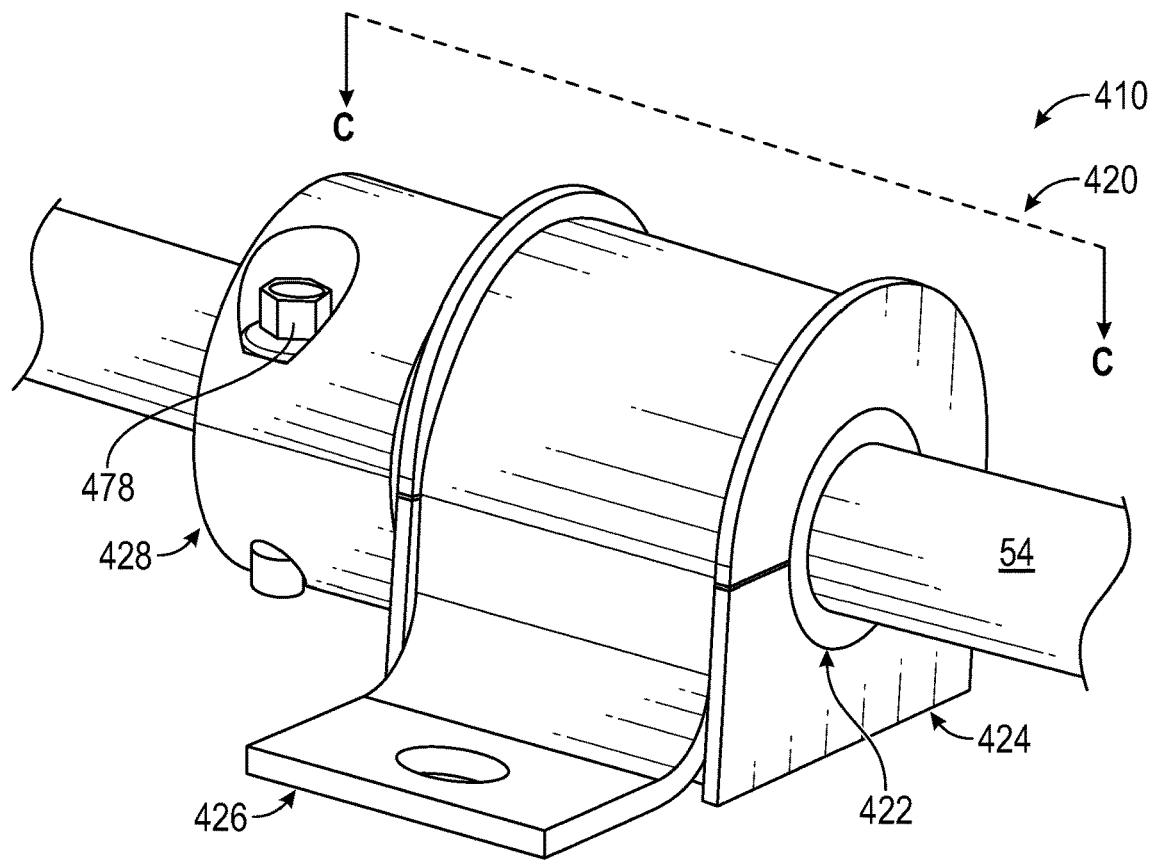
FIG. 8 is a perspective view of another embodiment of the bushing assembly including an adhesive layer, according to an exemplary embodiment.
Figure 9:
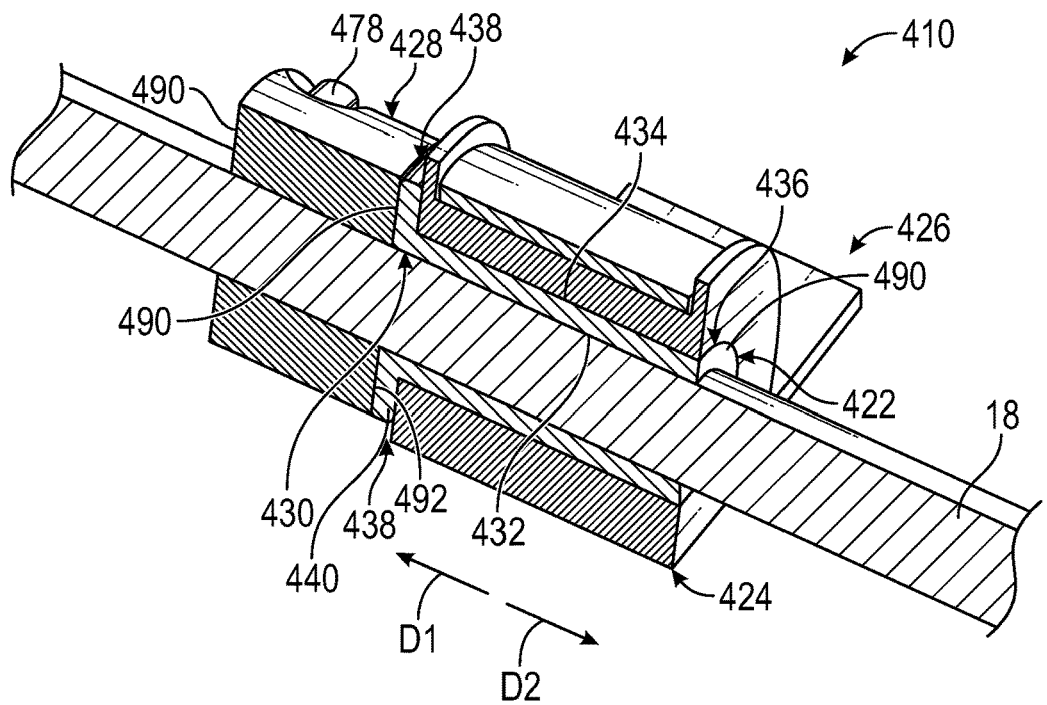
FIG. 9 is a cross-sectioned view of the stabilizer bar and the bushing assembly taken along section line C-C in FIG. 8, according to an exemplary embodiment.

As seen in FIG. 1, a split 56 is disposed lengthwise along the split ring 22. Referring to FIG. 2A, the split ring 22 defines a passageway 30 shaped to surround the stabilizer bar 18, an inner diameter surface 32, an outer diameter surface 34, a first split ring end 36, a second split ring end 38, and at least one axial retention flange 40. The inner diameter surface 32 is disposed along the passageway 30 of the split ring 22 and engages with an outer surface 54 (FIG. 3) of the stabilizer bar 18. In the embodiment as shown in FIGS. 1-2A, the split ring 22 includes two axial retention flanges 40A, 40B, where the first axial retention flange 40A is disposed at the first split ring end 36 and the second axial retention flange 40B is offset from the second split ring end 38 by a distance D. In contrast, in the alternative embodiment as shown in FIGS. 5-6, the split ring 122 includes first and second retention flanges 140A, 140B disposed at the first split ring end 136 and the second split ring end 138. In the embodiment as shown in FIG. 8-9, the split ring 422 includes only one axial retention flange 440. Referring back to FIGS. 1 and 2A, the elastomer bushing 24 defines an inner diameter 42, an outer surface 44, a first bushing end 46, a second bushing end 48, a first axial flange 50 disposed at the first bushing end 46, and a second axial flange 52 disposed at the second bushing end 48.

At least one of the first axial flange 50 and the second axial flange 52 of the elastomer bushing 24 abut against the at least one axial retention flange 40 of the split ring 22 to create a zero clearance condition. For example, in the embodiment as shown in FIGS. 1 and 2A, both the first axial flange 50 and the second axial flange 52 of the elastomer bushing 24 define outer surfaces 60, 62 that abut against and engage with inner surfaces 64A, 64B of the first axial retention flange 40A and the second axial retention flange 40B of the split ring 22. Thus, the zero clearance condition exists between the first axial flange 50 of the elastomer bushing 24 and the first axial retention flange 40A of the split ring 22 and the second axial flange 52 of the elastomer bushing 24 and the second axial retention flange 40B of the split ring 22.

The zero clearance condition between the elastomer bushing 24 and the split ring 22 causes the bushing assembly 20 to have a relatively high axial rate. The axial rate is the resistance of the bushing assembly 20 to axial deflection. A relatively high axial rate results in a minimal or zero cross-car deflection created by side loads. Specifically, the relatively high axial rate of the two bushing assemblies 20 that are part of the stabilizer bar assembly is at least 1 Kilonewton/millimeter for the first millimeter of axial deflection, however, it is to be appreciated that after the first millimeter of axial deflection, the axial rate increases in value. It is also to be appreciated that minimal or zero cross-car deflection allows the stabilizer bar 18 to exist in tight packaging spaces while still maintaining torsional freedom of the stabilizer bar 18. Furthermore, as explained the in process flow diagram shown in FIG. 4, the split clamp 28 is tightened to the stabilizer bar 18 once the bushing assembly 20 is assembled to the vehicle frame, thereby absorbing any frame build variations.

Figure 2B:
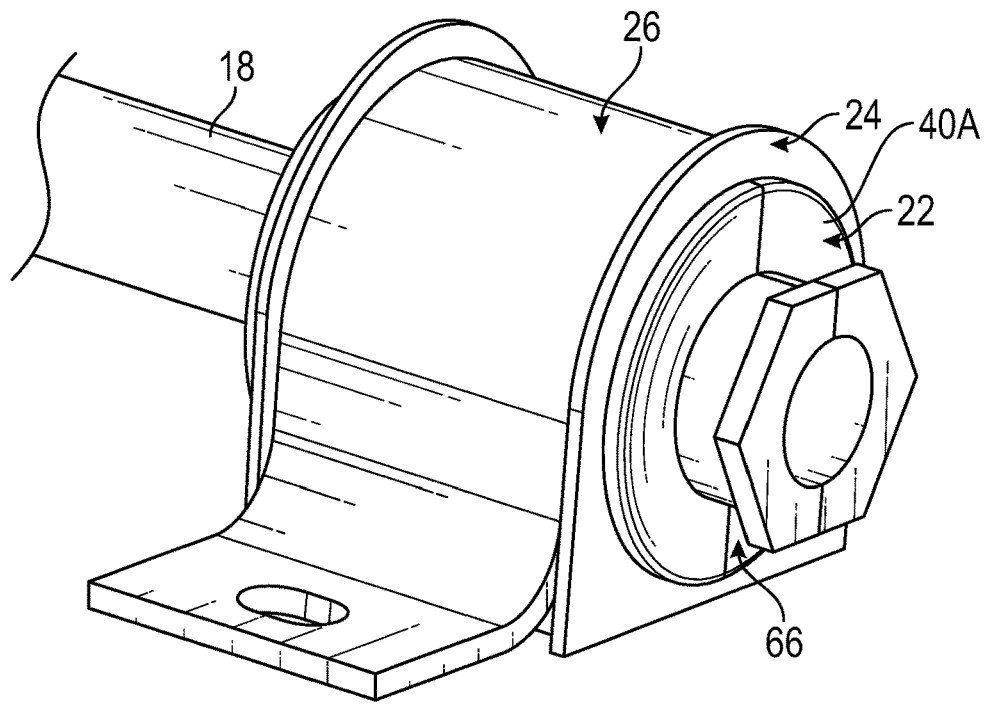
FIG. 2B is an illustration of the bushing assembly 20 when viewed from the second split ring end 38, where the split clamp 28 has been removed, according to an exemplary embodiment.

FIG. 2B is an illustration of the bushing assembly 20 when viewed from the second split ring end 38, where the split clamp 28 has been removed. Referring to FIGS. 2A and 2B, the split ring 22 further includes a locking feature 66 disposed at the second split ring end 38. In the embodiment as shown in FIG. 2B, the locking feature 66 is a hexagonal feature which may be referred to as a hex lock. As described below, the split clamp 28 is assembled over the locking feature 66 located at the second split ring end 38. The split ring 22 is constructed of a material having a relatively low coefficient of friction less than about 0.35 and a relatively high stiffness. Specifically, in an embodiment, relatively high stiffness of the split ring 22 is a flexural modulus of at least about 3.1 Gigapascals. One example of a material that the split ring 22 is constructed of is an acetal homopolymer, however, other materials such as steel and aluminum may be used as well.

The elastomer bushing 24 is constructed of an elastomeric material having a durometer that ranges from about 50 A to about 90 A on the Shore A scale such as, for example, natural rubber or styrene-butadiene rubber (SBR). The inner diameter 42 of the elastomer bushing engages with the outer diameter surface 34 of the split ring 22. The inner diameter 42 of the elastomer bushing 24 has a reduced coefficient of friction when compared to the elastomeric material that the elastomer bushing 24 is constructed of, thereby facilitating torsional rotation relative to the split ring 22. In an embodiment, the reduced coefficient of friction is created by placing either a polytetrafluoroethylene (PFTE) liner or lubricant pockets along the inner diameter 42 of the elastomer bushing 24. Referring specifically to FIG. 1, a split 70 is disposed lengthwise along the elastomer bushing 24.

During assembly of the bushing assembly 20, the split ring 22 is first positioned along an outer surface 54 the stabilizer bar 18. Specifically, in an embodiment, the two halves 74 of the split ring 22 are snap fit together over the stabilizer bar 18. Once the split ring 22 is positioned along the stabilizer bar 18, the elastomer bushing 24 is pulled open at the split 70 disposed lengthwise along the elastomer bushing 24, and the elastomer bushing 24 is placed around outer diameter surface 34 of the split ring 22. The elastomer bushing 24 is secured by in place around the outer diameter surface 34 of the split ring 22 by the strap clamp 26. Specifically, the strap clamp 26 is placed over the outer surface 44 of the elastomer bushing 24. The strap clamp 26 is constructed of a rigid material such as, but not limited to, steel. Once the elastomer bushing 24 is secured in place by the strap clamp 26, the split clamp 28 is assembled to the split ring 22. In an embodiment, the strap clamp 26 is first bolted to a chassis of a vehicle, and then the split clamp 28.

The split clamp 28 is constructed of a metal or metal alloy. The split clamp 28 is divided into two halves 74 that are secured to one another by a plurality of mechanical fasteners 76 (shown in FIG. 1). In the embodiment as shown in the FIG. 1, the two halves 74 of the split clamp 28 are symmetrical with one another, however, it is to be appreciated that the two halves 74 may not be symmetrical. Moreover, although the figures illustrate the mechanical fasteners 76 as nut and bolt fasteners, other types of mechanical fasteners may be used as well. Referring to FIG. 2A, the two halves 74 of the split clamp 28 are placed over the locking feature 66 located at the second split ring end 38. As explained in the process flow diagram shown in FIG. 4, the mechanical fasteners 76 first loosely secure the two halves 74 of the split clamp 28 to one another. The mechanical fasteners 76 are then tightened once the stabilizer bar 18 is installed and centered axially within the vehicle.

Figure 3:
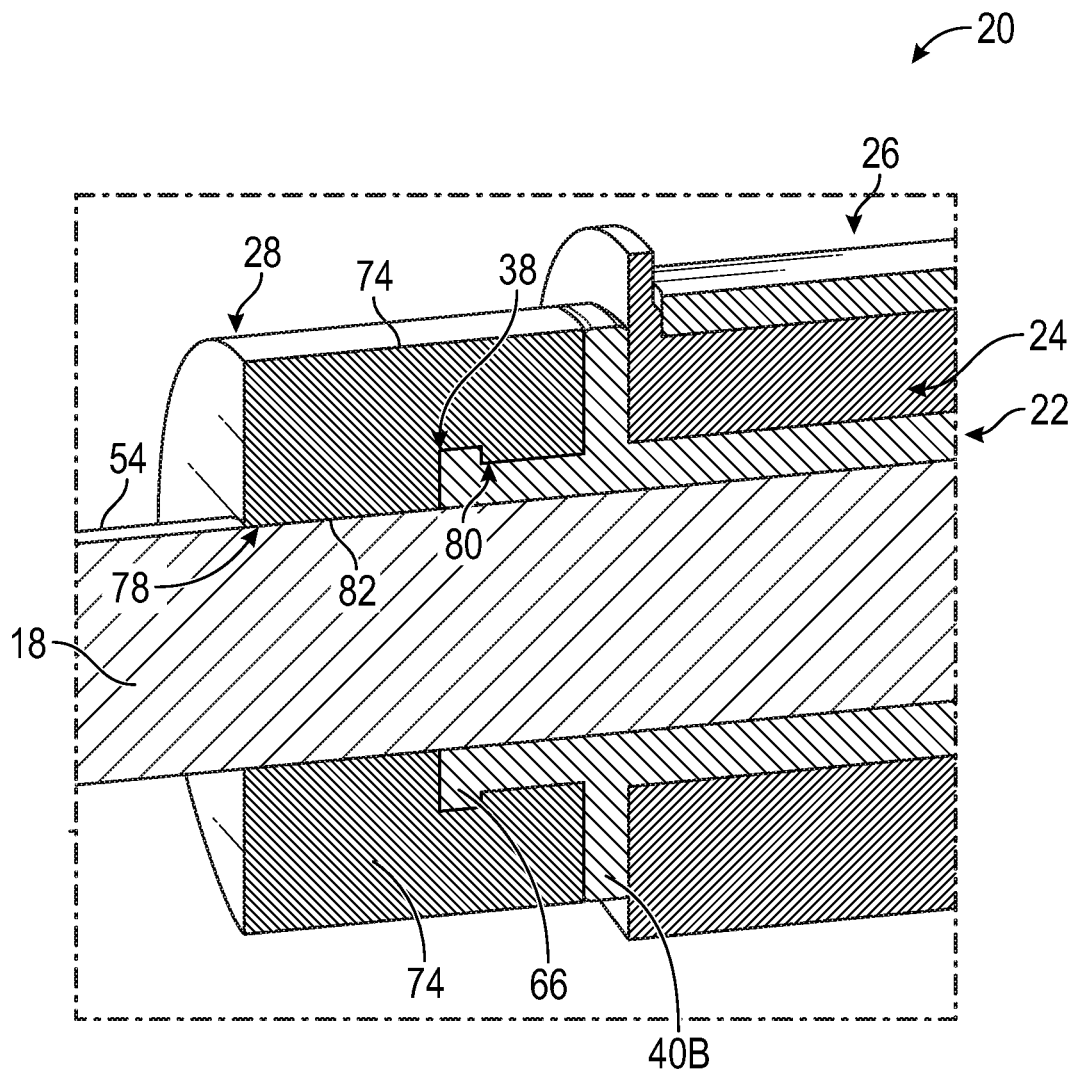
FIG. 3 is an enlarged cross-sectioned view of a portion of the stabilizer bar and the bushing assembly shown in FIG. 2A, according to an exemplary embodiment.

FIG. 3 is an enlarged view of the bushing assembly 20 including the second split ring end 38 of the split ring 22 and the split clamp 28. The split clamp 28 defines an inner passage 78 defining an inner surface 82 that is shaped to surround and engage with the outer surface 54 of the stabilizer bar 18. A step 80 is located within the inner passage 78 of the split clamp 28 that is shaped to surround and engage with the locking feature 66 located at the second split ring end 38. Referring to FIGS. 1 and 3, once the stabilizer bar 18 is installed and centered axially on the vehicle, the mechanical fasteners 76 are tightened to compress the two halves 74 of the split clamp 28 to one another, thereby securing the stabilizer bar 18 to the bushing assembly 20 by a mechanical interlock. The mechanical interlock is created between the split clamp 28 and the split ring 22 as well as between the split clamp 28 and the stabilizer bar 18 caused by tension in the mechanical fasteners 76 once tightened.

Figure 4:
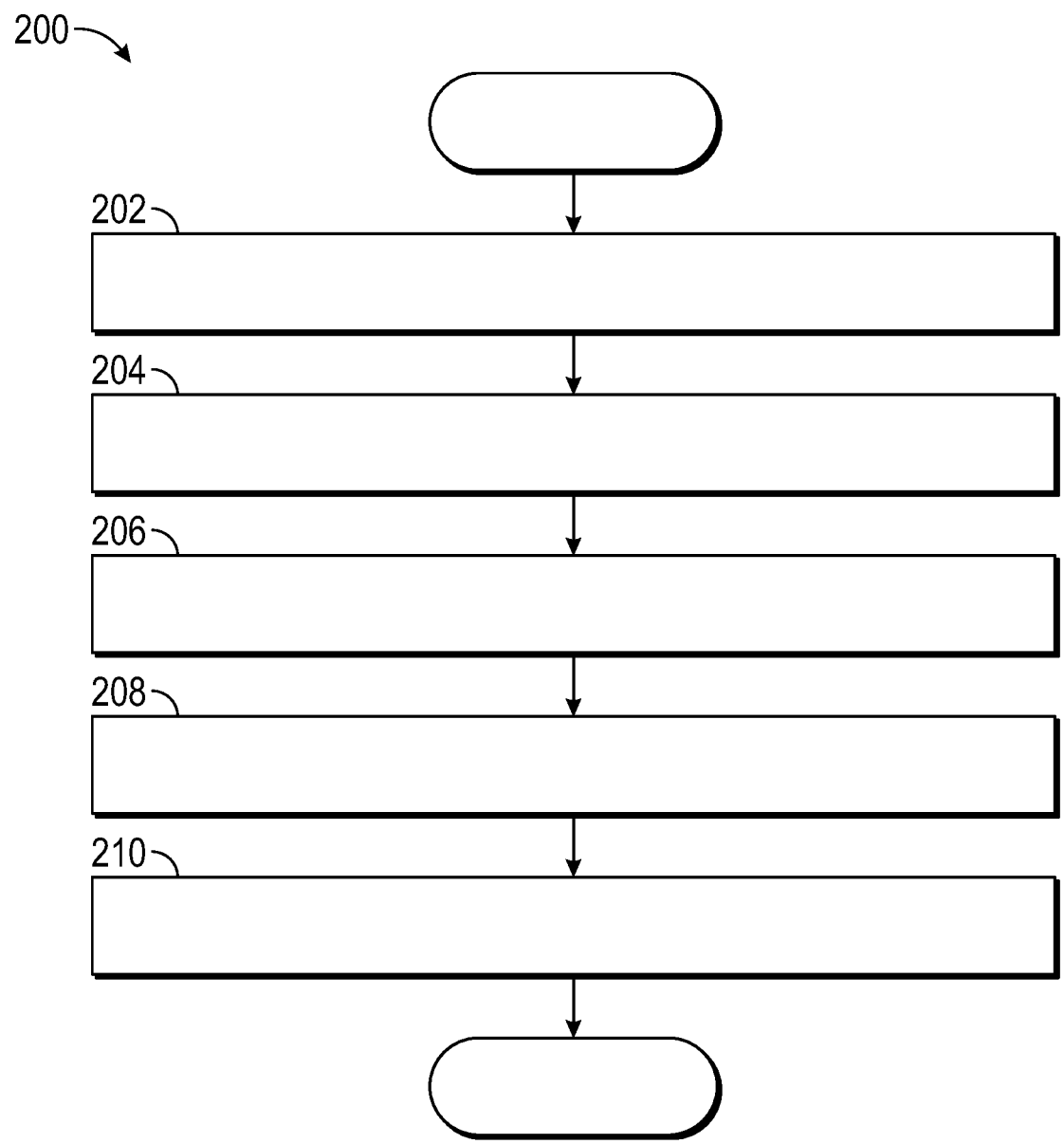
FIG. 4 is a process flow diagram illustrating a method of assembling the bushing assembly shown in FIGS. 1-3 and the stabilizer bar to a vehicle, according to an exemplary embodiment.

FIG. 4 is a process flow diagram illustrating a method 200 for assembling the bushing assembly 20 to a vehicle frame. Referring specifically to FIGS. 1, 2, and 4, the method 200 begins at block 202. In block 202, the split ring 22 is positioned along the outer surface 54 the stabilizer bar 18. The method 200 may then proceed to block 204.

In block 204, the elastomer bushing 24 is placed around the outer surface 44 of the split ring 22. The elastomer bushing 24 is secured in place around the outer surface 44 of the split ring 22 by the strap clamp 26. The method 200 may then proceed to block 206.

In block 206, the two halves 74 of the split clamp 28 are placed over the locking feature 66 located at the second split ring end 38, and the mechanical fasteners 76 first loosely secure the two halves 74 of the split clamp 28 to one another. The method 200 may then proceed to block 208.

In block 208, the stabilizer bar assembly 10 is centered axially using a measurement jig or other device, and is then secured to the vehicle frame (not shown) by fasteners (not shown) received by the apertures 16 of the strap clamp 26 (FIG. 1) for each of the two bushing assemblies 20 corresponding to the left and right sides of the vehicle. The method 200 may then proceed to block 210.

In block 210, the mechanical fasteners 76 are tightened to compress the two halves 74 of the split clamp 28 against one another. The compression between the two halves 74 of the split clamp 28 create the mechanical interlock between the split clamp 28 and the split ring 22 as well as between the split clamp 28 and the stabilizer bar 18. It is to be appreciated that the because the two halves 74 of the split clamp 28 are compressed against one another after the bushing assembly 20 is assembled to the vehicle frame, any frame build variations are absorbed. The method 200 may then terminate.

Referring now to FIGS. 5 and 6, an alternative embodiment of the bushing assembly 120 is shown. In the embodiment as shown in FIG. 5, the bushing assembly 20 includes a split ring 122, an elastomer bushing 124, and a strap clamp 126. The split ring 122 defines a passageway 130 shaped to surround the stabilizer bar 18, an inner diameter surface 132, an outer diameter surface 134, a first split ring end 136, a second split ring end 138, a first axial retention flange 140A, and a second axial retention flange 140B. The first axial retention flange 140A is disposed at the first split ring end 136 and the second axial retention flange 140B disposed at the second split ring end 138. The bushing assembly 120 shown in FIGS. 5-6 does not include the split clamp 28 or the mechanical fasteners 76 that are shown in FIGS. 1 and 2. Instead, referring to FIG. 6, an adhesive layer 156 is disposed along the inner diameter surface 132 of the passageway 130 of the split ring 122. The adhesive layer 156 includes an adhesive that either bonds or adheres to the outer surface 54 of the stabilizer bar 18. One example of an adhesive that may be used for the adhesive layer 156 is an epoxy adhesive.

Figure 7:
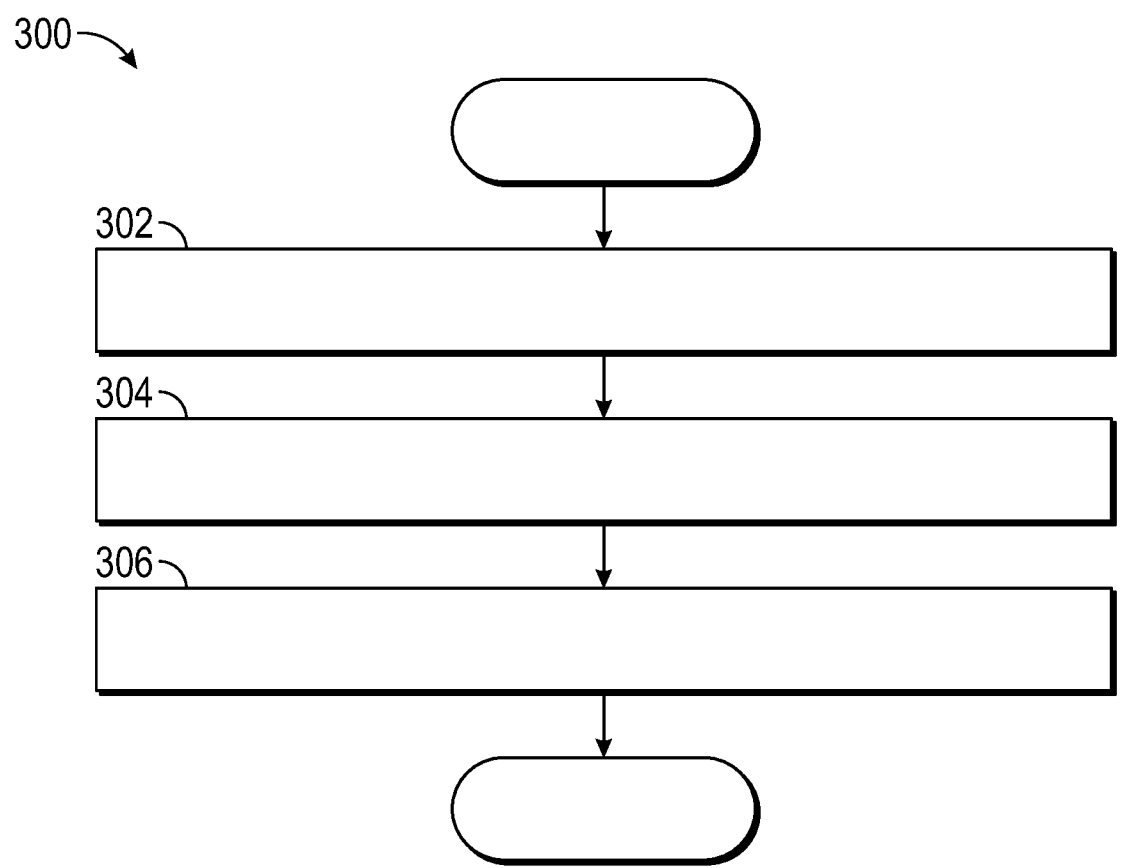
FIG. 7 is a process flow diagram illustrating a method of assembling the bushing assembly shown in FIGS. 5-6 and the stabilizer bar to a vehicle, according to an exemplary embodiment.

FIG. 7 is a process flow diagram illustrating a method 300 for assembling the bushing assembly 120 seen in FIGS. 5-6. Referring specifically to FIGS. 5-7, the method 300 begins at block 302. In block 302, the adhesive layer 156 is applied along the inner diameter surface 132 is disposed along the passageway 130 of the split ring 122. The method 300 may then proceed to block 304.

In block 304, the split ring 122 is positioned along the outer surface 54 the stabilizer bar 18. The method 300 may then proceed to block 306.

In block 306, the elastomer bushing 124 is placed around the outer surface 144 of the split ring 122. The elastomer bushing 124 is secured in place around the outer surface 144 of the split ring 122 by the strap clamp 126. The method 300 may then proceed to block 308.

In block 308, the stabilizer bar assembly 110 is centered axially using a measurement jig or other device and is then secured to the vehicle frame for each of the bushing assemblies 120 corresponding to the left and right sides of the vehicle. It is to be appreciated that the stabilizer bar assembly 110 is secured to the vehicle frame before the adhesive layer 156 dries or cures completely. The method 300 may then terminate.

FIGS. 8-9 illustrate yet another embodiment of the bushing assembly 420. The bushing assembly 420 includes a split ring 422, an elastomer bushing 424, a strap clamp 426, and a split clamp 428. The split ring 422 defines a passageway 430 shaped to surround the stabilizer bar 18, an inner diameter surface 432, an outer diameter surface 434, a first split ring end 436, a second split ring end 438, and a single axial retention flange 440. In the embodiment as shown in FIGS. 8-9, the axial retention flange 440 is disposed at the second split ring end 438 of the split ring 422, between the elastomer bushing 424 and the split clamp 428.

As seen in FIG. 9, the split ring 422 does not include the locking feature 66 located at the second split ring end 438 as the embodiment as shown in FIGS. 1, 2A, 2B, and 3. As a result, no mechanical interlock is created between the split clamp 428 and the split ring 422 when the mechanical fasteners 478 for the split clamp 428 are tightened. However, the mechanical interlock is achieved between the split clamp 428 and the stabilizer bar 18. The split ring 422 includes opposing end surfaces 490. In the embodiment as shown in FIG. 9, one of the end surfaces 490 of the split ring 422 abut against an end surface 492 of the split clamp 428, which limits axial motion in a first direction D1. However, in embodiments the axial retention flange 440 is disposed at the first split ring end 436 and the axial retention flange 440 abuts against the end surface 490 of the split clamp 428 instead, thereby limiting axial motion in a second direction D2 that opposes the first direction D1. Since the stabilizer bar assembly 410 includes two bushing assemblies 420, one of the bushing assemblies 420 may limit axial movement in the first direction D1 while the remaining bushing assembly 420 limits axial movement in the second direction D2, which in turn allows for the stabilizer bar assembly 410 to react to both left side load and right side roads as the vehicle moves.

Referring generally to the figures, the disclosed bushing assemblies provide various technical effects and benefits. Specifically, the zero clearance condition between the elastomer bushing and the split ring causes the bushing assembly to have a relatively high axial rate, which results in a minimal or zero cross-car deflection that is created by side loads. The minimal or zero cross-car deflection allows for the stabilizer bar to exist in tight packaging spaces, while at the same time maintaining torsional freedom of the stabilizer bar. Furthermore, in embodiments where a split clamp creates a mechanical interlock with the split ring, the compression between the two halves of the split clamp absorb any frame build variations.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A bushing assembly for a stabilizer bar in a vehicle, the bushing assembly comprising:
    a split ring defining a passageway that engages with an outer surface of the stabilizer bar, an outer diameter surface, a first split ring end, a second split ring end, at least one axial retention flange disposed at either the first split ring end or the second split ring end, and a locking feature disposed at the second split ring end;
    an elastomer bushing defining an inner diameter, an outer diameter, a first bushing end, a second bushing end, a first axial flange disposed at the first bushing end, and a second axial flange disposed at the second bushing end, wherein the inner diameter of the elastomer bushing engages with the outer diameter surface of the split ring, and at least one of the first axial flange and the second axial flange abut against the at least one axial retention flange of the split ring to create a zero clearance condition;
    a strap clamp disposed over the outer diameter of the elastomer bushing, wherein the strap clamp secures the bushing assembly to the vehicle;
    a split clamp divided into two halves, wherein the split clamp defines an inner passage and a step located within the inner passage, and wherein the inner passage has an inner surface shaped to surround and engage with the outer surface of the stabilizer bar and the step is shaped to surround and engage with the locking feature located at the second split ring end, and wherein the split clamp is disposed over the locking feature located at the second split ring end of the split ring; and
    a plurality of mechanical fasteners that secure the two halves of the split clamp together, wherein a mechanical interlock is created between the split clamp and the split ring that is caused by tension as the plurality of mechanical fasteners are tightened.

2. The bushing assembly of claim 1, wherein the inner diameter of the elastomer bushing has a reduced coefficient of friction when compared to an elastomeric material the elastomer bushing is constructed of.

3. The bushing assembly of claim 2, wherein the reduced coefficient of friction is created by either a polytetrafluoroethylene (PFTE) liner or lubricant pockets disposed around the inner diameter of the elastomer bushing.

4. The bushing assembly of claim 1, wherein the split ring includes a second axial retention flange that is offset from the second split ring end.

5. The bushing assembly of claim 1, wherein the split ring is constructed of a material having a coefficient of friction less than about 0.35 and a flexural modulus of at least about 3.1 Gigapascals.

6. The bushing assembly of claim 1, wherein the elastomer bushing is constructed of an elastomeric material having a durometer that ranges from about 50 A to about 90 A on the Shore A scale.

7. The bushing assembly of claim 1, wherein the split ring includes a second axial retention flange disposed at the second split ring end.

8. The bushing assembly of claim 7, further comprising a split clamp divided into two halves, wherein an end surface of the split ring abuts against an end surface of the split clamp.

9. The bushing assembly of claim 1, further comprising an adhesive layer disposed along an inner diameter surface of the passageway of the split ring.

10. The bushing assembly of claim 9, wherein the adhesive layer includes an adhesive that either bonds or adheres to the outer surface of the stabilizer bar.

11. The bushing assembly of claim 1, wherein the locking feature is a hex lock.

12. The bushing assembly of claim 1, wherein the split ring is constructed of an acetal homopolymer.

13. A method for assembling a stabilizer bar assembly including a bushing assembly to a vehicle frame, the method comprising:
   positioning a split ring along an outer surface a stabilizer bar, wherein the split ring defines a passageway that engages with the outer surface of the stabilizer bar, an outer diameter surface, a first split ring end, a second split ring end, at least one axial retention flange disposed at either the first split ring end or the second split ring end, and a locking feature disposed at the second split ring end;
   secure an elastomer bushing around the outer surface of the split ring by a strap clamp, wherein the elastomer bushing defines a first bushing end, a second bushing end, a first axial flange disposed at the first bushing end, and a second axial flange disposed at the second bushing end, wherein at least one of the first axial flange and the second axial flange abut against the at least one axial retention flange of the split ring to create a zero clearance condition;
   placing two halves of a split clamp over a locking feature located at the second split ring end of the split ring, wherein the split clamp defines an inner passage and a step located within the inner passage, and wherein the inner passage has an inner surface shaped to surround and engage with the outer surface of the stabilizer bar and the step is shaped to surround and engage with the locking feature located at the second split ring end, and wherein the split clamp is disposed over the locking feature located at the second split ring end of the split ring;
   loosely securing the two halves of the split clamp to one another by a plurality of mechanical fasteners; and
   tightening the plurality of mechanical fasteners to compress the two halves of the split clamp against one another, wherein a mechanical interlock is created between the split clamp and the split ring that is caused by tension as the plurality of mechanical fasteners are tightened.

14. The method of claim 13, further comprising:
   centering the stabilizer bar assembly axially; and
   securing the stabilizer bar assembly to the vehicle frame by the strap clamp.

15. A bushing assembly for a stabilizer bar in a vehicle, the bushing assembly comprising:
   a split ring defining a passageway that engages with an outer surface of the stabilizer bar, an outer diameter surface, a first split ring end, a second split ring end, a locking feature disposed at the second split ring end, at least one axial retention flange disposed at either the first split ring end or the second split ring end, and a locking feature disposed at the second split ring end;
   an elastomer bushing defining an inner diameter, an outer diameter, a first bushing end, a second bushing end, a first axial flange disposed at the first bushing end, and a second axial flange disposed at the second bushing end, wherein the inner diameter of the elastomer bushing engages with the outer diameter surface of the split ring, and at least one of the first axial flange and the second axial flange abut against the at least one axial retention flange of the split ring to create a zero clearance condition;
   a strap clamp disposed over the outer diameter of the elastomer bushing, wherein the strap clamp secures the bushing assembly to the vehicle;
   a split clamp divided into two halves, wherein the split clamp is disposed over the locking feature located at the second split ring end of the split ring, wherein the split clamp defines an inner passage and a step located within the inner passage, and wherein the inner passage has an inner surface shaped to surround and engage with the outer surface of the stabilizer bar and the step is shaped to surround and engage with the locking feature located at the second split ring end, and wherein the split clamp is disposed over the locking feature located at the second split ring end of the split ring; and
   a plurality of mechanical fasteners that secure the two halves of the split clamp together, wherein a mechanical interlock is created between the split clamp and the split ring that is caused by tension as the plurality of mechanical fasteners are tightened.

16. The bushing assembly of claim 15, wherein the locking feature is a hex lock.

17. The bushing assembly of claim 15, wherein the split ring is constructed of an acetal homopolymer.

\* \* \* \* \*